INVENTOR
Jacob H. Fawkes

UNITED STATES PATENT OFFICE.

JACOB H. FAWKES, OF PORTLAND, OREGON.

PNEUMATIC VEHICLE-WHEEL.

1,181,100.  Specification of Letters Patent.  Patented Apr. 25, 1916.

Application filed March 5, 1915. Serial No. 12,419.

*To all whom it may concern:*

Be it known that I, JACOB H. FAWKES, a citizen of the United States, and a resident of Portland, county of Multnomah, and State of Oregon, have invented a new and useful Improvement in Pneumatic Vehicle-Wheels, of which the following is a specification.

My invention relates to vehicle wheels of the pneumatic type and has for its object to provide a pneumatic tired wheel of simple and strong construction embodying the following special features: The wheel frame shall be of a built-up type, that is to say, made up of a plurality of parts readily and rigidly assembled on the hub of the wheel, and inclosed by two wheel sides. The tire of the wheel shall be demountably seated in the rim of the wheel, and this construction shall be of such character as to permit the tire to be readily collapsed and demounted by merely deflating the inner pneumatic or inflation tube. The tire shall have a certain maximum resiliency regardless of the width of the tire. The wheel shall be adapted to keep out dust and dirt, and the hub of the wheel shall be adapted to be used on the spindle common to the usual running gear of vehicles.

Other incidental features of my invention are brought out fully in the description of my tire.

The construction of my tire whereby I attain the above specified features is best understood by a description of the accompanying drawings, constituting a part of this specification.

Figure 1:
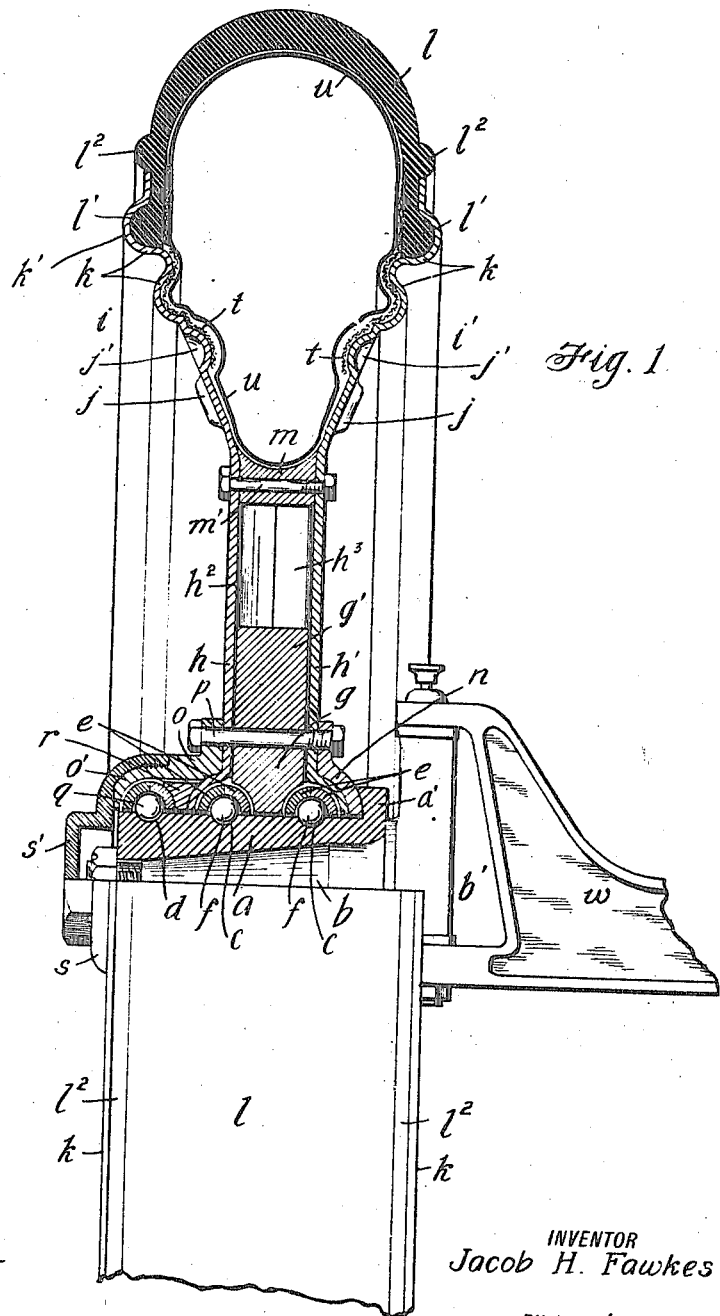
Figure 2:
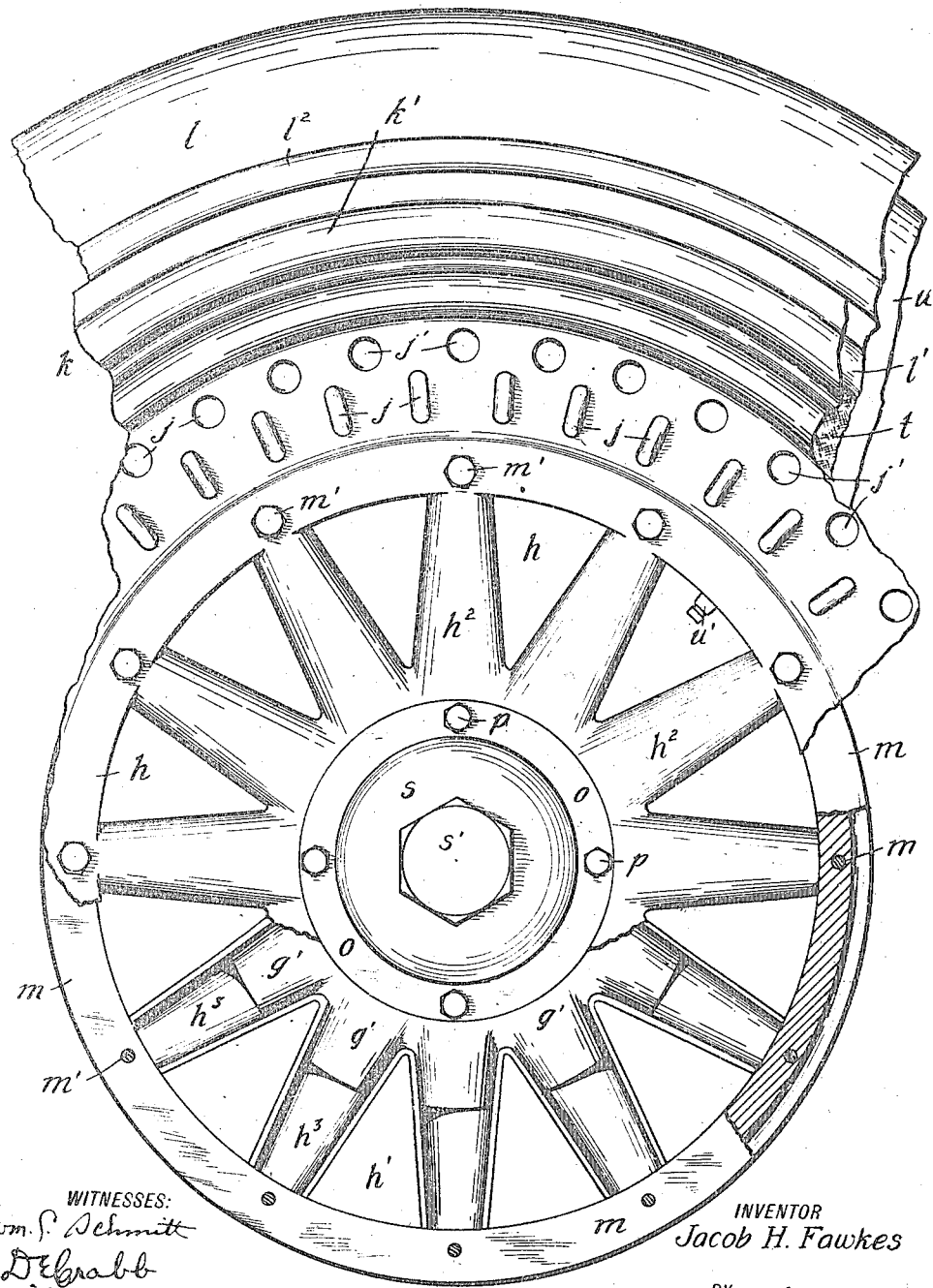

In the drawings, Figure 1 shows in its upper half a diametric section of my improved vehicle wheel and in its lower half shows an end elevation of the same, and Fig. 2 is a fragmental front elevation with parts broken away so as to disclose details of construction.

I will describe the parts of my improved wheel in the order in which the same are assembled when putting one of my wheels together.

The hub $a$ is made with an internal taper so that it will fit the common tapered spindle $b$ of the usual form found in vehicle axles. The hub $a$ is made with peripheral grooves $c$, and $d$, for ball bearings. Over the peripheral grooves $c$, are located segmental, annular housings $e$, forming with said grooves ball races for the ball bearings $f$. Between the housings $e$, $e$, and bearing on the latter is mounted a stub-spoke element $g$, comprising an eye and plurality of stub-spokes $g'$ as seen by comparing Figs. 1 and 2. Exterior of said stub-spoke element are mounted wheel sides $h$, $h'$, the inner portions of which are adapted to bear on the housings $e$, $e$, as shown in Fig. 1. Said wheel-sides $b$, $b'$ are blanked and formed so as to form the abutting radial spoke sections $h^2$ and $h^3$ respectively, and when the wheel is assembled, the stub spokes $g'$ will project into and reinforce the spokes thus formed by the abutting sections. The outer portions of the wheel sides are made with circumferential flaring flanges $i$, $i'$ adapted to form a seat for the tire or outer casing $l$. Such circumferential flanges are provided with stiffening elements consisting of pressed-out and pressed-in protruding portions $j$, and $j'$ staggered relatively to each other; and said circumferential flanges of the wheel sides are further made with annular tire locking cavities $k$ and with other concentric undulating surfaces $k$. The tire or outer casing $l$ is made with concentric protrusions $l'$, $l^2$, of which the protrusions $l'$ are located and adapted to bear in the annular cavities $k$ of the circumferential flanges of the wheel sides and the protrusions $l^2$ are located and adapted to bear on the periphery of said flanges of the wheel sides.

At the base of the flanges of the wheel sides is provided a circumferential ring $m$, which is secured in place by bolts $m'$, extending through the wheel sides. A stiffening ring $n$ is affixed on the hub and bears on the inner portion of the inner wheel side $h'$, and a companion stiffening ring $o$ is affixed on the outer wheel side $h$, adjacent the hub. The stiffening rings $n$ and $o$ are secured in place by a through-bolt $p$, as shown in Fig. 1. The outer stiffening ring $o$ is made with an extension $o'$, which incloses a ball-bearing element $q$, located with respect to the peripheral groove $d$, of the hub $a$. The annular ring $r$ is interposed between the base of the outer wheel side $h$ and the housing of the ball bearing element $q$. On the extension $o'$ of the stiffening ring $o$ is threaded a cap $s$, the latter being provided with a nut head $s'$. The tire or outer casing $l$ is made with inner flap portions $t$, of a flexible character and arranged to lie in the concentric undulating surfaces of the circumferential flanges $i$, $i'$ of the wheel sides $h$, $h'$, and in so doing contribute toward the holding of the tire firmly in place. In the tire is located the usual inflation tube $u$, inflated through the valve $u'$. When the tube $u$ is inflated the extended flexible portions $t$ of the tire sides will be forced into undulating surfaces of the flanges $i$, $i'$ and in so doing contribute to the holding of the tire firmly on the wheel rim. The cap $s$ is made with a nut head $s'$ for convenience.

$w$ represents part of a vehicle axle of conventional form to which the spindle $b$ of the stub-axle $b'$ is secured by means permitting the axle to rotate in horizontal plane.

It will be observed that by reason of the protrusions $l'$ of the tire or outer casing bearing on the periphery of the circumferential flanges of the wheel sides, such arrangement constitutes an effective means for excluding dirt and dust. It is to be noted that by reason of the width of the inner cushion or inflation tube $u$, in horizontal section, the same offers as great a degree of resiliency as would a cushion of circular cross-section, but by reason of the more-or-less oval construction of the tire portion of my wheel, a narrow tire can be used without sacrificing the desired degree of resiliency. It is also to be noted that so long as the inflation tube $u$ is inflated, the tire or outer casing portions $l'$ and also $l^2$ will be rigidly held in interlocking relation with the circumferential flanges of the wheel sides, in so doing holding the tire firmly in place. But the demounting of the tire is, nevertheless, readily accomplished by merely deflating the inner tube $u$, then pressing or collapsing the tire inward, whereupon it may be readily removed and replaced. The peripheral protuberances $h'$ on the exterior of the flanges of the rim also serve as guards, preventing the tire being injured by striking against the curb of the street or other surfaces.

I claim:

The combination in a wheel of a flanged rim each of the sides of which is provided with an annularly extending cavity near the periphery, and each of said flanges being further made with undulations inward of said cavity, an outer casing or tire formed like an inverted U having beads located at its sides adapted for being seated in said annularly extending cavities of the flanges of the wheel rim, also having other concentric beads located for being seated on the edges of said flanges for the purpose described, the sides of the casing being further provided with flexible extended portions adapted for bearing against the interior of the inwardly located undulated portions of said flanges, and a pneumatic tube located in said wheel rim and tire.

JACOB H. FAWKES.

Witnesses:
WM. C. SCHMITT,
D. E. CRABB.